March 9, 1965
E. R. LOWE
3,172,674
DIAPHRAGM CHUCK AND GAUGE
Filed Dec. 4, 1961
2 Sheets-Sheet 1
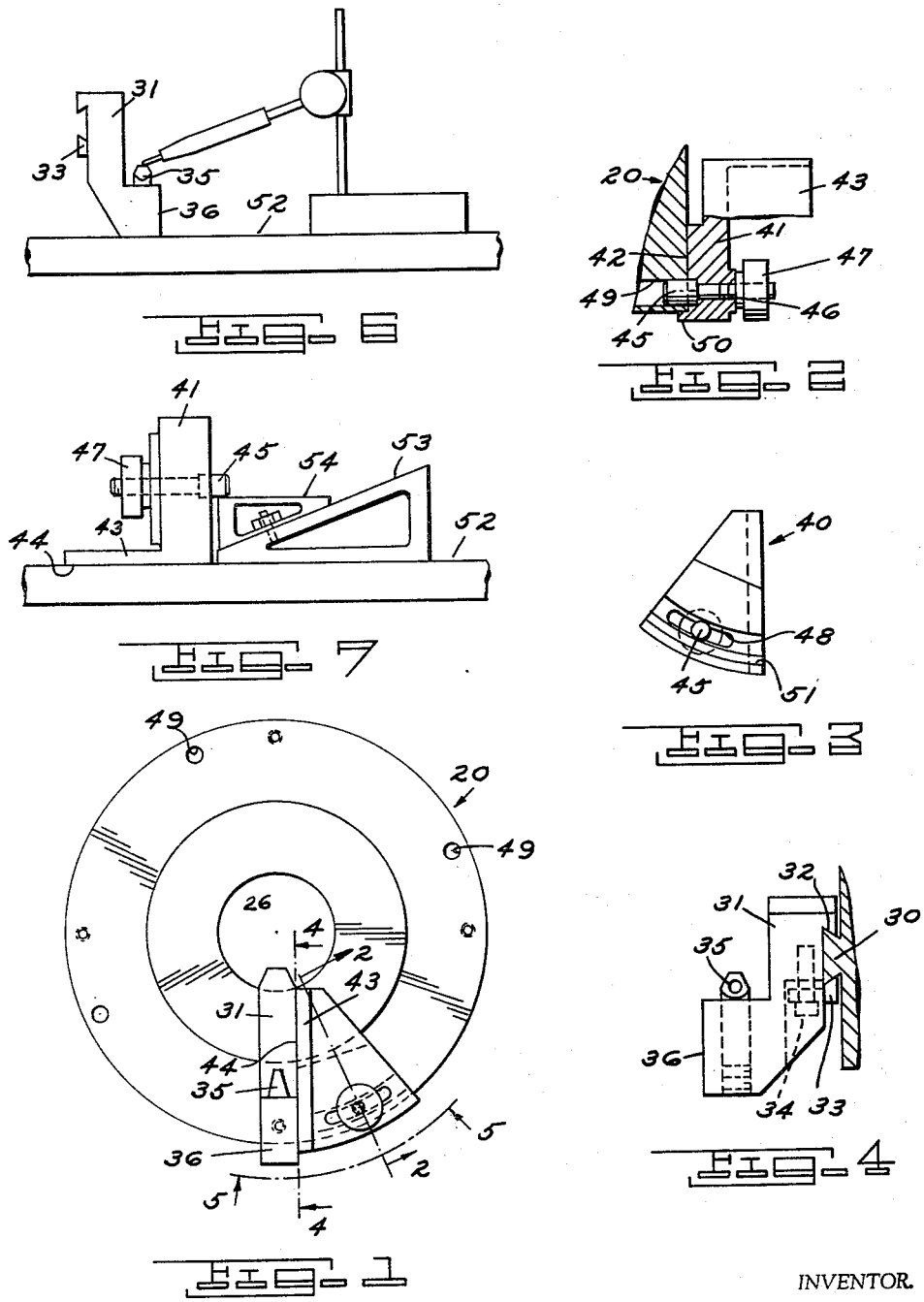
INVENTOR.
EARL R. LOWE
BY
Barnes, Kisselle, Raisch & Choate
ATTORNEYS

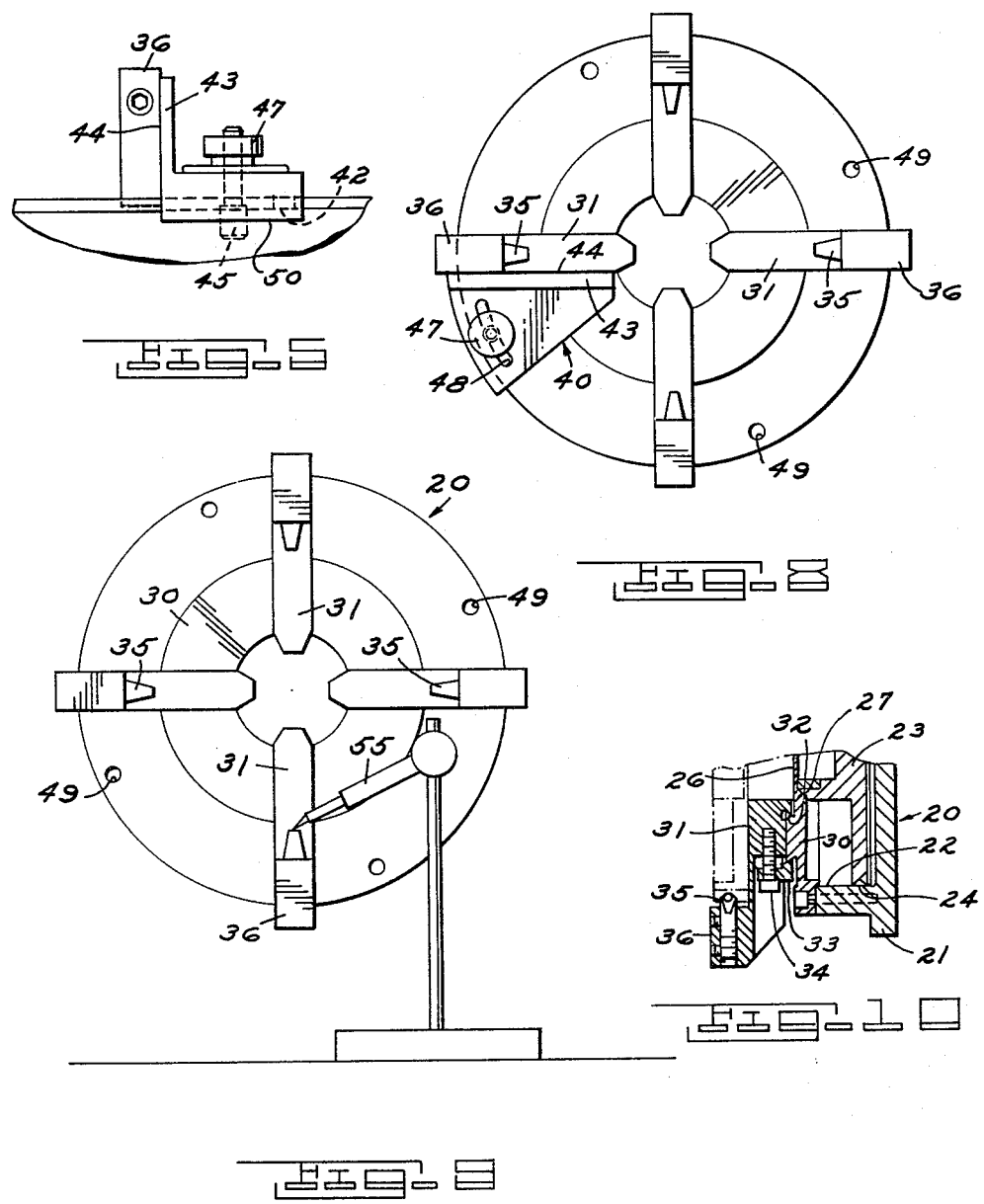

United States Patent Office 3,172,674
Patented Mar. 9, 1965

---

3,172,674
DIAPHRAGM CHUCK AND GAUGE
Earl R. Lowe, East Detroit, Mich.
(31116 San Juan Drive, Mount Clemens, Mich.)
Filed Dec. 4, 1961, Ser. No. 156,687
12 Claims. (Cl. 279—1)

This invention relates to the setting up of a diaphragm chuck and particularly to circumferentially locating the jaws on a diaphragm chuck so that they can properly engage a workpiece.

In my Patent 2,965,384, titled Diaphragm Chuck, issued December 20, 1960, there is disclosed and claimed a diaphragm chuck which comprises a body that supports a diaphragm. The diaphragm is provided with an annular dovetail on which a plurality of jaws are adjustably mounted circumferentially. The diaphragm chuck includes a piston that is operable upon the application of fluid pressure to flex the diaphragm and expand the jaws sufficiently to permit the insertion of the workpiece. When the fluid pressure is relieved, the diaphragm is unflexed so that the jaws engage the workpiece.

This invention is directed to the problem of circumferentially locating the jaws quickly for any predetermined workpiece. It can be appreciated that unless some quick and accurate method of circumferentially locating the jaws is obtained, considerable time and effort will be expanded in setting up such a diaphragm chuck for any particular workpiece.

It is therefore an object of this invention to provide an apparatus for accurately and quickly circumferentially locating the jaws on a diaphragm chuck.

Basically, the invention comprises utilizing a locator gauge that is provided with a guide surface and means thereon which engage predetermined accurate points on the chuck. The interengaging means of the gauge are adjustable relative to the guide surface of the gauge so that the gauge can be adjusted prior to application on the chuck for any particular workpiece. In this manner, by successively using the same gauge to locate a plurality of jaws the diaphragm chuck can be accurately and quickly set up for holding a particular workpiece.

In the drawings:

FIG. 1 is an elevation of a diaphragm chuck showing the accurate positioning of one jaw on the chuck in accordance with the invention.

FIG. 2 is a fragmentary sectional view taken along the line 2—2 in FIG. 1.

FIG. 3 is a bottom plan view of the locating gauge.

FIG. 4 is a fragmentary sectional view taken along the line 4—4 in FIG. 1.

FIG. 5 is a fragmentary view taken along the line 5—5 in FIG. 1.

FIG. 6 is an elevational view showing the presetting of a jaw prior to its mounting on the diaphragm chuck.

FIG. 7 is an elevational view showing the presetting of the locator gauge prior to its mounting on the diaphragm chuck.

FIG. 8 is a view similar to FIG. 1 showing the chuck after a plurality of jaws have been mounted thereon.

FIG. 9 is a view similar to FIG. 8 showing the checking of the concentricity of the jaws after they are mounted on the chuck and the chuck is mounted on the machine.

FIG. 10 is a fragmentary sectional view taken along a radial plane in FIG. 8.

Referring to FIGS. 1 and 10, the diaphragm chuck 20 comprises a body 21 that has a central bore 22 defining a cylinder in which a piston 23 is mounted, the piston 23 having a sealing ring 24 around the periphery thereof. Air or hydraulic pressure is introduced into the cylinder through a central opening to cause the piston 23 to move toward the right as shown in FIG. 10 and expand a diaphragm 26 that closes the bore. The diaphragm has a shoulder 27 which is arranged to engage a corresponding shoulder formed at the leading end of the piston 23.

An annular dovetail 30 extending completely around the face of the diaphragm serves as a support for a plurality of jaws 31. Each of the jaws 31 is provided with a dovetail slot 32 for receiving the dovetail 30 on the diaphragm 26. Each jaw 31 includes a movable member 33 that is mounted on a screw 34 so that by tightening the screw 34, the jaw can be mounted on the dovetail 30. Each jaw 31 is also provided with a spherical work-engaging member 35 that is held in position by a set screw 36. The above construction is substantially as shown in my Patents 2,965,384 and 2,716,554.

According to the invention, it is desirable to accurately and quickly locate the position of each jaw 31 circumferentially on the dovetail 30 so that it will accurately and correctly locate and center the workpiece. It can be appreciated that as each type of workpiece changes, such as gears or workpieces of irregular contour, the relative circumferential position of the jaws 31 may change also. For example, when the chuck is used for supporting gears, the number and pitch of the teeth may vary from one type of workpiece to another type of workpiece so it is desirable and necessary to accurately and quickly adjust the position of the jaws.

According to the invention, a locating gauge 40 is utilized on the chuck. The gauge 40 comprises a base 41 that includes a base surface 42 adapted to engage the periphery of the diaphragm. In addition, the gauge 40 includes a wall 43 which extends generally radially and defines a guide surface 44 that is adapted to be engaged by the jaw 31 to accurately locate the jaw 31. The gauge 40 also includes a pin 45 that is mounted on a shaft 46. The pin 45 is enlarged and a hand wheel or knob 47 is threaded on the shaft 46. The shaft 46 extends through a slot 48 in the base 41. By loosening the knob 47, the position of the pin 45 in the slot and, in turn, relative to the wall 43 can be adjusted. The pin 45 is adapted to engage one of a plurality of accurately positioned openings 49 at circumferentially spaced points in the diaphragm.

The position of the pin 45 is adjusted on the gauge 40 in accordance with a predetermined calculated setting and the gauge 40 is mounted on the chuck. This positions the guide surface 44 properly so that when the jaw is brought into engagement with the surface 44 it is accurately located so that it can be locked in position. In order to lock the gauge in proper position when the pin 45 engages one of the openings 49, the gauge 40 is formed with a circumferential flange 50, the inner surface 51 of which has a center of curvature corresponding to the center of the chuck 20.

The setting up of the chuck will now be briefly described.

As shown in FIG. 6, each jaw 31 is first adjusted on a work table 52 so that the pin member 35 is at a predetermined position radially of the chuck when the jaw is mounted on the chuck. The exact position is calculated in advance in accordance with the design of the particular workpiece to be held.

Next, as shown in FIG. 7, the position of the pin 45 is adjusted relative to the surface 44 by positioning the surface 44 on a work table 52 and utilizing parallel or planar gauges 53. The exact height of the surface 54 on the sine gauge is first positioned in accordance with calculations as to the workpiece involved.

It can be appreciated that once the calculations have been made for a particular workpiece, they are readily available for subsequent setting up of a diaphragm chuck for holding the workpiece.

After the gauge 40 has been adjusted by positioning the pin 45 in a particular relationship to the surface 44, the gauge 40 is mounted on the chuck by inserting the pin 45 in one of the openings 49. This positions the guide surface 44 so that it is parallel to a radial plane by a sufficient distance so that the center of the jaw 31 will lie on a radial plane when the jaw 31 is brought into contact with the surface 44. The locking member 33 is then brought into position to lock the jaw on the chuck. The gauge 40 is then used for positioning successive jaws without any further setting (FIG. 8).

After all the jaws have been mounted on the chuck and the chuck is mounted on a machine, the concentricity can be double checked by utilizing a feeler gauge and indicator 55 and rotating the chuck 20 (FIG. 9). The inner ends of the members 35 will then be concentric. If it is desired to provide a more positive grip on the workpiece, each member 35 can be adjusted inwardly an additional amount as may be required so that each will grip the workpiece with a greater force when the fluid pressure on the diaphragm is relieved.

It can thus be seen that there has been provided an apparatus for accurately and quickly adjusting the position of jaws circumferentially on a diaphragm chuck where the jaws are circumferentially adjustable.

I claim:

1. The combination comprising a body member, a diaphragm attached to said body member, a piston in said body member for flexing said diaphragm, a plurality of circumferentially adjustable jaws secured to said diaphragm, a locating gauge having a guide surface against which each said jaw may be moved for circumferentially positioning each jaw, said chuck including circumferentially spaced locating means accurately positioned thereon, said gauge having interengaging means adapted to engage said locating means for positioning said gauge circumferentially on said chuck, said interengaging means being adjustable relative to said surface of said locating gauge.

2. The combination comprising a body member, a diaphragm attached to said body member, a piston in said body member for flexing said diaphragm, a pluarity of circumferentially adjustable jaws secured to said diaphragm, a locating gauge having a guide surface against which each said jaw may be moved for circumferentially positioning each jaw, said chuck including circumferentially spaced locating means accurately positioned thereon, said gauge having a locating member engaging said locating means for positioning said gauge circumferentially on said chuck, said locating member being adjustable relative to said surface of said locating gauge.

3. The combination comprising a body member, a diaphragm attached to said body member, a piston in said body member for flexing said diaphragm, a plurality of circumferentially adjustable jaws secured to said diaphragm, a locator gauge, said chuck having circumferentially spaced openings accurately positioned therein, said gauge having a substantially radial guide surface for engagement by a jaw to locate the jaw and a locating member adjustably mounted on said gauge for circumferential movement relative to said guide surface and adapted to engage one of said openings in said chuck.

4. The combination comprising a body member, a diaphragm attached to said body member, a piston in said body member for flexing said diaphragm, a plurality of circumferentially adjustable jaws secured to said diaphragm, a locator gauge, said chuck having circumferentially spaced openings accurately positioned therein, said gauge having a substantially radial guide surface for engagement by a jaw to locate the jaw, a locating member adjustably mounted on said gauge for circumferential movement relative to said guide surface and adapted to engage one of said openings in said chuck, and a flange on said gauge engaging the periphery of said chuck for locating said gauge radially on said chuck.

5. The combination comprising a body member, a diaphragm attached to said body member, a piston in said body member for flexing said diaphragm, a plurality of circumferentially adjustable jaws secured to said diaphragm, a locator gauge, said diaphragm having a plurality of circumferentially spaced axial openings accurately positioned therein, a pin adjustably mounted on said gauge and adapted to engage one of said openings, said gauge having a guide surface thereon adapted to be contacted by a jaw for circumferentially locating the jaw on the chuck.

6. The combination set forth in claim 5 wherein said gauge includes an arcuate circumferentially extending slot, means for moving and locking said pin in said slot and interengaging means between said gauge and the periphery of said chuck for locking said gauge in position on said chuck.

7. The combination set forth in claim 6 wherein said interengaging means includes a peripheral flange having a curved inner surface having the same radius of curvature as the periphery of the chuck and engaging said chuck to locate said gauge radially on said chuck.

8. The combination comprising a body member, a diaphragm attached to said body member, a piston in said body member for flexing said diaphragm, a plurality of circumferentially adjustable jaws secured to said diaphragm, a locator gauge comprising a base, a substantially radial wall and an arcuate flange adapted to engage the periphery of the chuck, said base having an arcuate slot therein having a center of curvature corresponding to the center of the chuck, a pin slidable in said slot, means for locking said pin in predetermined position in said slot, said diaphragm having a plurality of axial openings accurately positioned at predetermined circumferentially spaced points thereon, said pin of said locator gauge being adapted to selectively be positioned in one of said openings so that said radial wall provides a generally radial surface for locating a jaw circumferentially on said diaphragm.

9. The combination comprising a body member, a diaphragm attached to said body member, a piston in said body member for flexing said diaphragm, an annular dovetail ring on said diaphragm, a plurality of circumferentially adjustable jaws secured to said ring, a locating gauge having a guide surface against which each said jaw may be moved for circumferentially positioning each jaw, said chuck including circumferentially spaced locating means accurately positioned thereon, said gauge having interengaging means adapted to engage said locating means for positioning said gauge circumferentially on said chuck, said interengaging means being adjustable relative to said surface of said locating gauge.

10. The combination comprising a body member, a diaphragm attached to said body member, a piston in said body member for flexing said diaphragm, an annular dovetail ring on said diaphragm, a plurality of jaws adjustably secured to said ring, a locator gauge comprising a base, a radial wall and an arcuate flange adapted to engage the periphery of the chuck, said base having an arcute slot therein having a center of curvature corresponding to the center of the chuck, a pin slidable in said slot, means for locking said pin in predetermined position in said slot, said diaphragm having a plurality of axial openings accurately positioned at predetermined circumferentially spaced points thereon, said pin of said locator gauge being adapted to selectively be positioned in one of said openings to provide a generally radial surface for locating a jaw circumferentially on said diaphragm.

11. The combination comprising a chuck, a plurality of circumferentially adjustable jaws secured to said chuck, a locating gauge having a guide surface against which each said jaw may be moved for circumferentially positioning each jaw, said chuck including circumferentially spaced locating means accurately positioned thereon, said gauge having interengaging means adapted to engage said locating means for positioning said gauge circumferentially on said chuck, said interengaging means being adjustable relative to said surface of said locating gauge.

12. For use with a chuck having a plurality of circumferentially adjustable jaws secured thereto, a locating gauge comprising flange means for engaging the periphery of a chuck for locating the gauge radially on a chuck, a locating member adjustably mounted on said gauge and adapted to engage a plurality of circumferentially spaced points on a chuck, and a guide surface on said gauge extending substantially radially with respect to said flange means and adapted to engage a jaw to locate the jaw circumferentially.

References Cited in the file of this patent

UNITED STATES PATENTS

| | | |
|---|---|---|
| 596,375 | Murchie | Dec. 28, 1897 |
| 2,470,458 | Barr | May 17, 1949 |
| 2,568,585 | Howart | Sept. 18, 1951 |
| 2,572,013 | Cushman | Oct. 23, 1951 |
| 2,671,274 | Greenberger | Mar. 9, 1954 |
| 2,827,711 | Elschlager | Mar. 25, 1958 |
| 2,933,320 | Lyons | Apr. 19, 1960 |
| 2,953,045 | Carles | Sept. 20, 1960 |
| 3,041,079 | Garrison | June 26, 1962 |